3,795,737
CONTROL OF ANAPLASMOSIS IN CATTLE USING CARBANILIDES
Nicholas McHardy, 10 Downs Road, Beckenham, Kent, England; John Berger, Newton House, Alderley Edge, Cheshire, England; and Ruth M. Simpson, Kabete, Kenya, East Africa (% David Henderson, Esq., St. Saviours Road, Leicester, England)
Filed Mar. 10, 1971, Ser. No. 123,033
Claims priority, application Great Britain, Mar. 13, 1970, 12,347/70
Int. Cl. A61k 27/00
U.S. Cl. 424—273
17 Claims

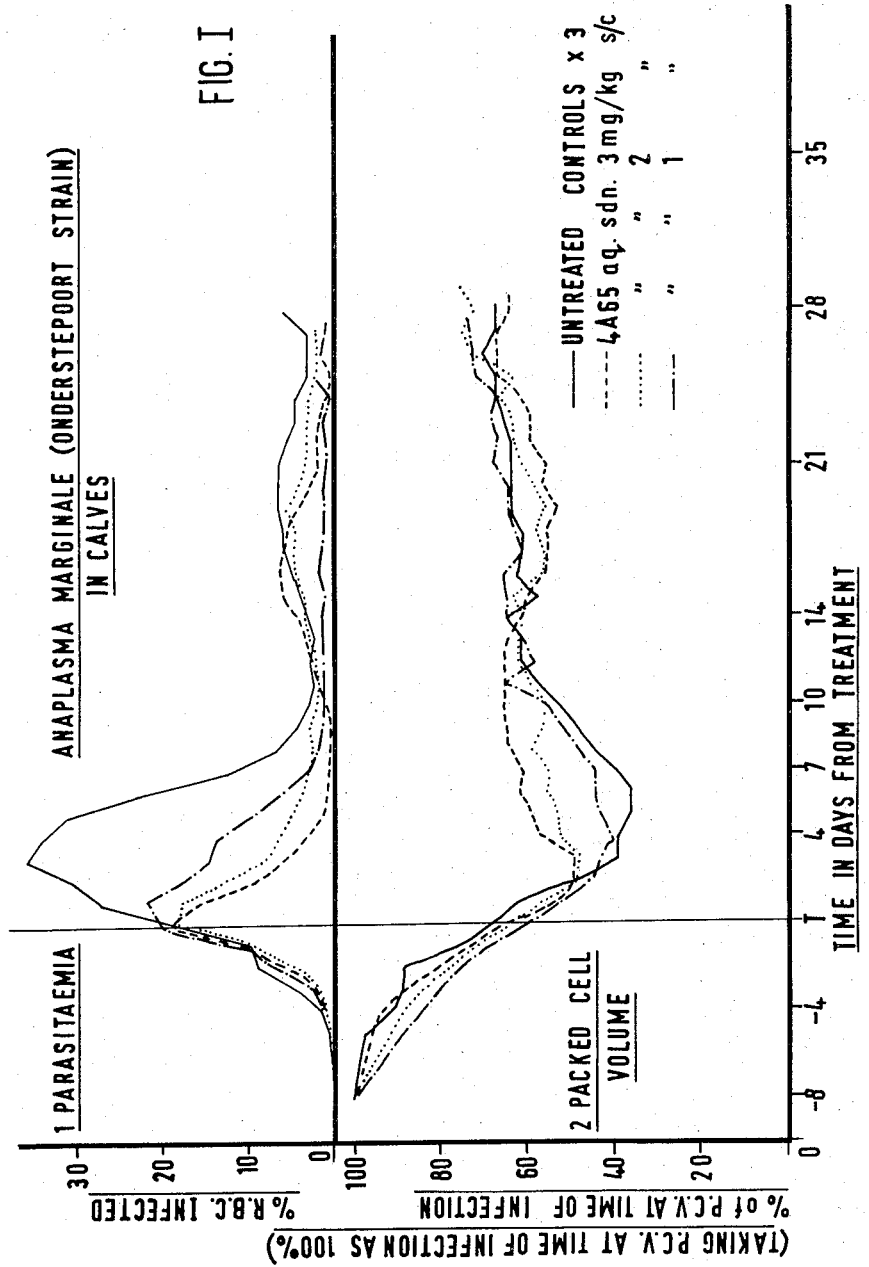

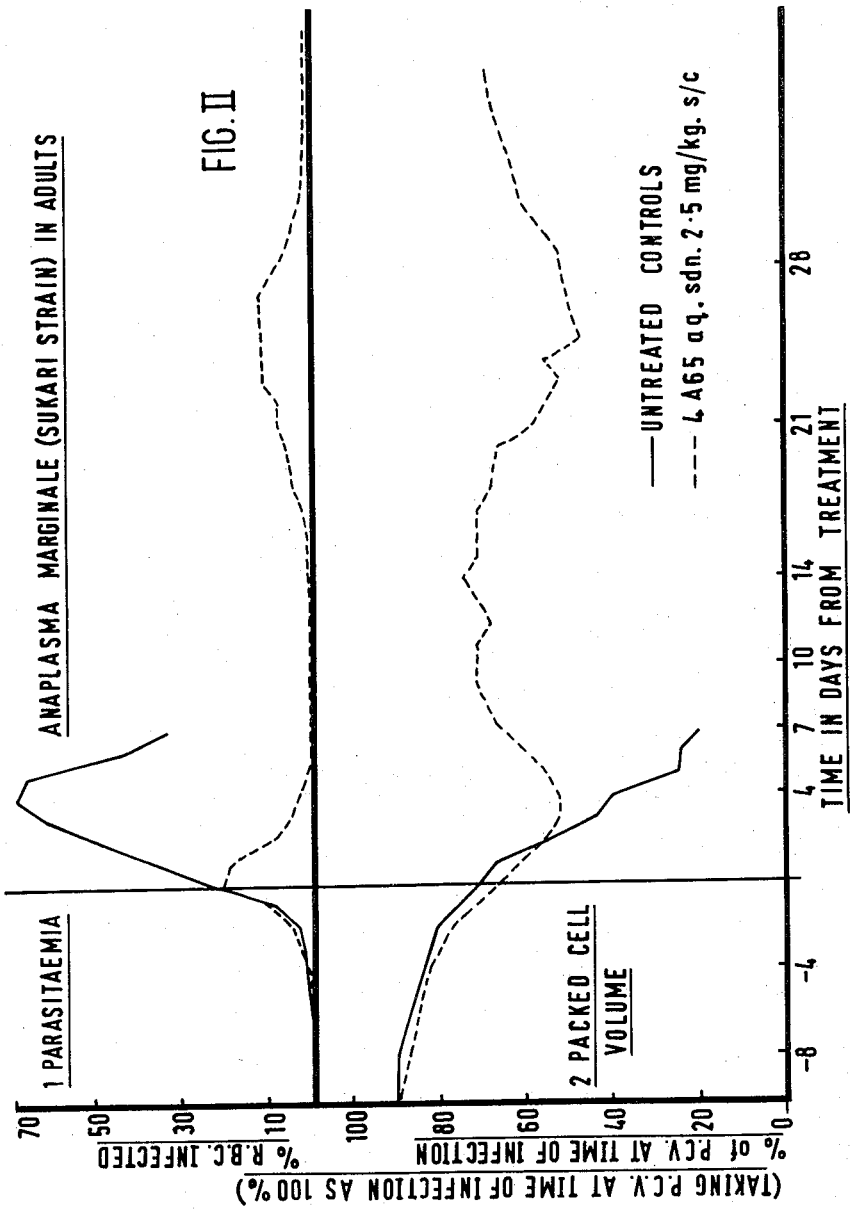

ABSTRACT OF THE DISCLOSURE

A method for the stimulation of immunity against anaplasmosis in cattle and for the virtual eradication of the causative organism of anaplasma in cattle which comprises the administration of an effectual amount of a compound of the Formula (I).

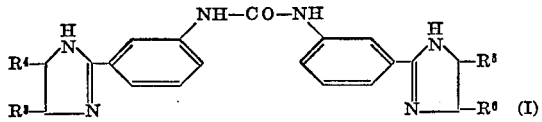

or a therapeutically acceptable acid addition salt thereof, wherein $R^3$, $R^4$, $R^5$ and $R^6$ are the same or different, and each is selected from the class consisting of a hydrogen atom and an alkyl group having from 1 to 4 carbon atoms, to accomplish the above.

---

The present invention relates to methods of treating and preventing anaplasmosis in cattle and to preparations suitable for administration to cattle.

Anaplasmosis is a serious systemic disease of cattle which is prevalent in large areas of the Asian, African and American continents and certain Southern areas of Europe which have a Mediterranean-type climate. The infecting organism, which may be *Anaplasma marginale* or *Anaplasma centrale*, attacks the red blood cells of the cattle characteristically causing fever, anaemia, loss of weight and general debility of the animal, which often prove fatal.

Anaplasma are substantially different from protozoa, and in particular from those of the genus Trypanosoma, in all relevant morphological, etiological and epidemiological aspects and are considered to occupy a taxonomical position between the smallest bacteria and filterable viruses (Weinnman and Ristic, "Infectious Blood Diseases of Man and Animals," Chapter 23, p. 501). Anaplasma which are aerobic organisms take the form of smaller bodies without visible cytoplasm whereas Trypanosoma have a structure of organelles including a single free flagellum. The metabolic difference is also reflected in the type of drug used for treatment of disease caused by Trypanosoma on the one hand and Anaplasma on the other.

The only established drugs that have been used for the treatment of anaplasmosis in cattle are chlorotetracycline ("Aureocycin") (Foote, L. E. et al., North Am. Veterinarian 32, pp. 547–549, 1951) and oxytetracycline ("Terramycin") (Miller, J. G. et al., Proc. Book Am. Vet. Med. Assoc. 89th Ann. Meeting pp. 160–167, 1952). However these suffer from the disadvantages that high dosages are normally required for treatment, and other microbes present in the animal may become resistant to these frequently used antibiotics and may spread to other animals or human hosts.

The specification of British Pat. No. 1,007,334 describes and claims a class of polybasic carbanilides which were found to be active against tuberculosis and cancer, and certain cases against protozoal diseases caused by Trypanosoma. The specification also states that the compounds should be administered intravenously or intraperitoneally in dosages above 5.5 mg. active ingredient/kg. body weight of animal and frequently around 20 mg./kg., for the treatment of these conditions.

The specification of U.S. Pat. No. 3,338,917 discloses the use of 3,3′-bis-(2-imidazolin-2-yl)carbanilide in the treatment of babesiosis, and also mentions the possibility of its use against anaplasmosis, without however disclosing the conditions required to overcome the difficulties associated with this disease.

It has now been found that 3,3′-bis-imidazolin derivatives of carbanilides of Formula I and their therapeutically acceptable acid addition salts (hereinafter referred to as the "salts"),

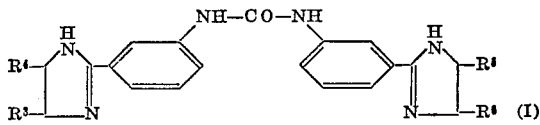

wherein $R^3$, $R^4$, $R^5$ and $R^6$ are the same or different and each is a hydrogen atom or an alkyl group having 1 to 4 carbon atoms, are particularly useful when administered to cattle infected with anaplasmosis, in so much as they unexpectedly stimulate immunity to subsequent attacks of the disease, provided the dosage of active ingredient administered is within a predetermined specific range. Furthermore it has also been found that the sterilization of "carrier" animals, i.e. virtually complete eradication of the causative organisms in the host animal, can also be achieved under appropriate conditions. Moreover the experimental investigations in this field opened the possibility of prophylaxis in apparently healthy animals.

The compounds of Formula I are preferably symmetrically substituted and the alkyl groups are preferably ethyl or most preferably methyl substituents. 3,3′-bis-(4-methyl-2-imidazolin-2-yl)-carbanilide and especially 3,3′-bis-(2-imidazolin-2-yl)-carbanilide in the form of their salts have been found to be particularly active against anaplasmosis.

Conveniently the hydrochloride salts of the compounds may be used, but it has been found that these salts can be replaced advantageously with salts having a greater solubility in aqueous media, which are thus eminently suitable for injectable formulations by reason of the reduction in volume required. For example salts of carboxylic acids such as the diformate or dilactate salts, and in particular the diacetate and most particularly the dipropionate salts may be used, the dipropionate having a solubility of up to 40 g. salt/100 ml. aqueous media.

In one aspect of the present invention there is provided 3,3′-bis-(2-imidazolin-2-yl) carbanilide dilactate as a novel salt.

The preparation of the compounds of Formula I may be carried out for instance by the processes described in the specification of the above-mentioned British Pat. No. 1,007,334, and they may be converted to the salts by known methods, for example by simple metathesis using the appropriate acid.

Compounds of Formula I and their salts may be presented in association with a carrier in pharmaceutical formulations suitable for parenteral (sub-cutaneous or intramuscular) or oral administration. A sterile injectable formulation is advantageously formed in an aqueous carrier, which may also contain bacteriostatic agents, antioxidants, buffers, solutes to render the solution isotonic with the blood, thickening agents, suspending agents or other pharmaceutically acceptable additives. Slow release of the drug may be achieved by emulsifying an aqueous phase containing the compound of Formula I or a salt thereof, in a mineral oil phase to produce a sterile emulsion. The injectable formulations may be presented in unit dose containers such as ampoules or disposable injection devices or in multi-dose forms such as bottles from which an appropriate dose may be withdrawn.

The formulations for oral administration may include as carriers solids to form tablets, capsules, granules or powder, or may include liquids for suspension or solutions, which may contain diluents, binding agents, dispersing agents, surface-active agents, lubricating agents, coating materials, colouring agents, solvents, thickening agents, suspending agents, or other pharmaceutically acceptable additives, and these preparations may be presented in unit dose form or multidose form, or as additives to feedstuffs.

Furthermore these pharmaceutical formulations can be supplemented with instructions explaining their use and the importance of the recommended doses in achieving the desired result, and these instructions therefore form a material part of the formulations.

In another aspect therefore there is provided written indications of the suitability of a compound of Formula I or a salt thereof as hereinbefore defined, as an active ingredient, in association with a pharmaceutically acceptable carrier therefor, said written indications prescribing for the parenteral treatment of anaplasmosis the administration of the contents at a dosage which is equivalent to 2 to 3 mg. of active ingredient/kg. body weight of animal per administration, or said written indications prescribing for the oral treatment of anaplasmosis the administration of the contents at a dosage which is equivalent to about 5 to 10 mg. of active ingredient/kg. body weight of animal per administration, or said written indications prescribing for the "sterilization" of anaplasmosis the repeated administration to carrier animals of the contents at a dosage which is equivalent to 2 to 3 mg. of active ingredient/kg. body weight of animal per administration over a period from a few days up to a few months, or said written indications prescribing for the prevention of anaplasmosis the repeated administration of the contents at a dosage which is equivalent to about 1 to 2 or 3 mg. of active ingredient/kg. body weight of animal per administration over a period from a few days up to about 1 month.

Since the natural incubation period for anaplasmosis is about 20 to 50 days in cattle, the youngest animal likely to require treatment would be a three weeks old calf, weighing about 20 to 50 kg. or more. The weight of contents of a unit dose container for treating a calf by the parenteral route of administration would therefore be about 40 to 150 mg., whereas for adult cattle weighing about 250 to 400 kg., the corresponding weight required would be about 500 to 1200 mg. However a multi-dose container may contain, for example, 1000 ml. of an appropriate pharmaceutical formulation, for example a 2.5 to 5% aqueous solution, from which the necessary dosage may be withdrawn as required.

Administration of a dosage of about 2 to 3 mg. of active ingredient/kg. body weight of animal (hereinafter referred to as "mg./kg."), to cattle, more specifically a dosage of about 2 mg./kg. for calves and about 2.5 mg./kg. for adult cattle, enables long-term immunity against anaplasmosis to be developed, in addition to counteracting the effects of the infection. After treatment the level of parasitaemia, calculated as the percentage of parasitized erythrocytes, is reduced, the extent of anaemia is decreased, as indicated by the improvement in the haemoglobin level or the "packed cell volume" (P.C.V.), the temperature of the animals returns to normal more rapidly than after treatment with known agents and consequently the animals commence feeding and regain their normal weight in a shorter time.

The immunity is engendered by the survival of some of the infecting Anaplasma at the afore-mentioned dosage level, which provides antigenic stimulation in the animal and causes a mild relapse, indicated by an increase in both parasitaemia and percentage loss of P.C.V., after about 15 to 20 days from treatment. Too high a dosage is usually followed by an undesirable early and severe relapse, indicating rapid and almost complete eradication or inactivation of the parasite to such an extent that hardly any antigenic stimulation occurs and no immunity develops. On the other hand a very low dosage fails to give immediate control of the level of anaemia and the percentage loss in P.C.V. falls to a dangerously low level, although some of the animals may recover eventually.

In yet another aspect of the invention there is provided a method for the stimulation of immunity against and the treatment of anaplasmosis in cattle, comprising the parenteral administration of a compound of Formula I or a salt thereof, as hereinbefore defined, at a dosage of 2 to 3 mg./kg. per administration or the oral administration of a compound of Formula I or a salt thereof, as hereinbefore defined, at a dosage of about 5 to 10 mg./kg. per administration to an animal infected with Anaplasma. In a particular aspect this may comprise the administration of the contents of a container, as hereinbefore defined, to provide the required treatment dosage (mg./kg.), in accordance with the written indications.

Whilst a single dose of active ingerdient is very effective for this purpose, a repeated dose can represent slight additional advantages, particularly in calves, provided the limit of the dosages given does not interfere with the necessary development of the mild acceptable relapse. For instance a second dose administered to calves ten days after the first dose has been found to delay the relapse and to result in a better recovery of the animals with increases in the weight gained.

In the prior art the intravenous or intraperitoneal routes of administration were employed for the treatment of anaplasmosis in cattle. However the compounds of the present invention may be administered advantageously by the sub-cutaneous and intramuscular routes. Sub-cutaneous administration is especially preferred by reason of the simplicity in its mode of operation.

Many animals survive infection with Anaplasma but remain "carriers" and represent a source of further infection of ticks which may then transmit the disease. It has been found that repeated treatment of "carrier" adult cattle with a compound of Formula I or a salt thereof, as hereinbefore defined, for example at a dosage per treatment of 2 to 3 mg./kg., administered over a period of from a few days to few months, or an equivalent thereof, unexpectedly provides virtual sterilization. The animal can be considered to be effectively sterilized when blood smears taken from the animal appear negative for a period of time, and when the intravenous inoculation of blood suitably treated from the animal into a splenectomized calf fails to produce any symptoms of anaplasmosis in the calf. In addition to the sterilization effected the adult cattle retain their immunity on repeated administration of the required dosage, in spite of the lack of immunogenicity produced when an equivalent total dosage is administered to cattle actually suffering from anaplasmosis.

In a further aspect therefore there is provided a method of sterilizing an infection with Anaplasma in carrier cattle, comprising the repeated administration to carrier animals of a compound of Formula I or a salt thereof, as hereinbefore defined, at a dosage of 2 to 3 mg./kg.

per administration, or an equivalent thereof, over a period of from a few days up to a few months. The administration may be effected orally or parenterally, but preferably by the subcutaneous administration of a pharmaceutically acceptable aqueous sterile emulsion to the animal. Typically 3 mg./kg. may be administered weakly by this preferred route for a period of one month.

In yet a further aspect the present invention provides a method of preventing anaplasmosis in cattle, comprising the repeated administration of a compound of Formula I or a salt thereof, as hereinbefore defined, in an effective prophylactive dosage to the apparently healthy animal. For instance a dosage of 1 to 2 or 3 mg./kg. administered over a period from a few days up to 1 month is preferred. Preferably the administration is effected by sub-cutaneous injection to the animal of a pharmaceutically acceptable aqueous sterile emulsion, which achieves slow release of the drug.

The following examples are given to illustrate the invention more particularly and the results obtained in field trials, but they do not limit the scope of the invention in any way.

EXAMPLE 1

1. Experimental animals (a) Calves.—The calves used were non-splenectomized high grade, predominantly Ayrshire or Friesian of about 7 weeks of age. They were all free of anaplasma and were susceptible to this disease and weighed 20 to 50 kg.

(b) Steers.—The Guernsey and Friesian high-grade non-splenectomized steers were negative to the *A. marginale* complement fixations test [Peters et al. Proc. 61st Annual Meeting (1971)], averaged 1½ years of age (range 15 to 24 months) and weighed 250 to 400 kg.

While held at the laboratory a strict acaricidal regimen was applied, ticks being controlled by spraying at 4 to 5 day intervals with toxaphene and dioxthion at the manufacturer's recommended concentrations.

2. Methods of observation (a) Parasitaemia.—Giemsa-stained, thin blood films were prepared for estimation of parasitaemia; approximately 1,000 erythrocytes were counted and the number of parasitized erythrocytes taken to the nearest whole number percent.

(b) Packed cell volume.—The packed cell volume was measured by the volume of sediment of red blood cells after centrifugation of blood in a Hawksley Micro-Haematocrit centrifuge for 6 minutes.

3. Infections and treatments

The trials were intended to evaluate the efficacy of 3,3'-bis-(2-imidazolin-2-yl)carbanilide dihydrochloride, hereinafter referred to as "Imidocarb," in controlling both multiplication of *A. marginale* and the pathological consequences thereof in the bovine host, during the patent parasitaemia rise of an acute anaplasmosis reaction. In each trial the response in treated groups was compared with the reactions observed in a number of untreated controls.

(a) Intact calves.—(1) Groups of 3 to 6 calves were infected by the intravenous injection of blood containing the Onderstepoort, South African, strain of *A. marginale*. The intravenous inoculation of 5 to 10 ml. blood exhibiting approximately 20% *A. marginale* parasitaemia induced an acute anaplasmosis reaction following a 3 to 5 day prepatent period.

When the percentage parasitized erythrocytes reached levels of about 20% and were doubling daily, a single treatment of 3 mg./kg. of "Imidocarb" was given to calves taken at random, leaving 1 or more calves of each group untreated as controls of infectivity and virulence. The delay between sampling for haematalogical estimations and treatment was about 3 to 6 hours.

(2) The above experiment was repeated, using however the Sukari, Kenyan strain of *A. marginale*.

(3) In further groups of intact calves, infected as described in either (1) or (2), the effect of changes in dosage was investigated by the subcutaneous administration of 3 mg./kg., 2 mg./kg., 1 mg./kg. or nil "Imidocarb" to calves taken at random, at a parasitaemia level of about 20%.

(4) 12 calves infected with the Sukari strain were divided into two groups to compare the effect of 2 mg./kg., "Imidocarb" administered by the subcutaneous and intramuscular routes on the calves attaining a parasitaemia of 15%.

(5) 8 calves were treated with a single dosage of 2.5 mg./kg. "Imidocarb" subcutaneously in the acute stage of Sukari anaplasmosis, while a further 8 calves, similarly infected and treated, were given a second dosage 10 days after the first, to investigate if any improvement were thereby obtained.

(6) A comparison was made between the effectiveness of 3,3'-bis-(2-imidazolin-2-yl) carbanilide dihydrochloride, i.e. "Imidocarb" and 3,3'-bis-(4-methyl-2-imidazolin-2-yl) carbanilide dihydrochloride in the treatment of anaplasmosis, by subcutaneous administration of 1.5 mg./kg. of each compound to one of two groups of calves infected with the Sukari strain.

(b) Intact steers.—(1) 12 steers were infected by the intravenous injection of 5 ml. of blood containing the Sukari strain, and exhibiting 10% parasitaemia, inducing patent infections following a 5 to 7 day, prepatent period. 9 steers were treated with 2.5 mg./kg. "Imidocarb", when the parasitaemia level was about 20%, the remaining animals acting as untreated controls.

(2) 26 adults on reaching 30% parasitaemia, which was produced as in (1), were treated with either 3.5, 2.5 or 1.5 mg./kg. "Imidocarb" administered subcutaneously, with 7 animals in each group and 5 untreated controls, to determine the effect of change of dosage in the treatment of anaplasmosis.

(3) A comparison of single, double and triple treatment of steers infected with the Sukari strain by administration of "Imidocarb" was made. On attaining 30% parasitaemia or more 28 animals were treated with 2.5 mg./kg. of "Imidocarb" administered subcutaneously leaving 6 controls.

Of the 28 animals:
(i) 7 received a single treatment
(ii) 7 received 1.25 mg./kg. 7 days after 1st treatment
(iii) 7 received 1.25 mg./kg. 14 days after 1st treatment
(iv) 7 received 1.25 mg./kg. 7 and 14 days after 1st treatment.

(4) 5 adult carriers of *Anaplasma marginale* were treated weekly with 3 mg./kg. of "Imidocarb" in an aqueous sterile emulsion for one month to determine whether the infections would be effectively sterilized.

(5) 1 mk./kg. of "Imidocarb" was administered subcutaneously to each of 6 healthly adults on alternate days for 20 days and then challenged with the Sukari strain to determine whether the animals could resist the infection.

4. Containers for the pharmaceutical formulations (i) Containers were industrially prepared containing (a) 40 mg. (b) 100 mg. and (c) 150 mg. "Imidocarb" in the form of 4.5% aqueous sterile solutions, as unit dosages for calves in the body weight range 20 to 50 kg. in the treatment of anaplasmosis. Labels were affixed to the containers prescribing administration by the subcutaneous route at a dosage corresponding to 2 to 3 mg. "Imidocarb"/kg. calf body weight for the treatment of anaplasmosis in calves.

(ii) Multidose containers holding 1000 ml. of a 4.5% aqueous, sterile solution of "Imidocarb" were prepared, and labels affixed prescribing the amount of solution to be withdrawn per dosage for subcutaneous administration to each calf, to be equivalent to 2 to 3 mg. "Imidocarb"/ kg. calf body weight.

(iii) Similar containers to those described under (i) were prepared containing (a) 500 mg. (b) 800 mg. (c) 1200 mg. "Imidocarb" in 4.5% aqueous sterile solutions, as unit dosages for adult cattle in the body weight range 250 to 400 kg. in the treatment of anaplasmosis.

(iv) Similar multidose containers to those described under (ii) were prepared and labels affixed prescribing the use of the contents in the treatment of anaplasmosis in adult cattle.

RESULTS

Table I gives a summary of the observations made in calves in the aforementioned experiments, being prepared from average values for the various parameters.

Table II is a corresponding summary of observations made in steers in the aforementioned experiments.

FIG. I shows pictorially the effect on the parasitaemia and P.C.V. of infection of calves with the Onderstepoort strain of *A. marginale* and their subsequent treatment with various dosages of "Imidocarb."

FIG. II shows pictorially a comparison of steers infected with the Sukari strain of *A. marginale* and held as controls with those steers similarly infected and subsequently treated with "Imidocarb".

(a) Intact calves.—In the untreated control calves infected with the Onderstepoort strain of *A. marginale*, the peak percentage parasitaemias averaged about 35% with reduction to 5% in 7 days from treatment, and a reduction in P.C.V. from the time of treatment to the minimum of nearly 50%. In comparison, the infected calves treated with 3 mg./kg. "Imidocarb" experienced much less severe reactions: control of parasitaemia was immediate with reduction to 5% in 2 days and in most cases to zero in 6 days, before a relapse to a parasitaemia of 2.5% after 16 days. In addition the percentage less in P.C.V. after treatment was about half that of the untreated controls and the weight gains were considerably higher. There appeared to be negligible difference in the results obtained with infection with the Onderstepoort and the Sukari strains of *A. marginale*.

The required dosage of "Imidocarb" for the treatment of anaplasmosis and stimulation of immunity was found to be 2 mg./kg. on subcutaneous administration (cf. FIG. I). At this dosage the parasitaemia was controlled almost immediately and reached a parasitaemia level of 5% in 4½ days, with a mild relapse to this value after 19 days from treatment. Administration of a 3 mg./kg. dosage resulted in the fastest control of parasitaemia but an earlier and more severe relapse after only 15 days, with consequent reduction in antigenic stimulation and degree of immunity that could develop. On the other hand a dosage of 1 mg./kg. failed to give immediate control of parasitaemia with a period of 6 days to reduction to 5%, and no relapse occurred. The packed cell volume loss in the first two treatments was about 25%, whereas the 1 mg./kg. treatment caused a dangerously low P.C.V. of about 45%, approximating to the controls value, although some of the calves made a reasonable recovery after a time.

Treatment by both the subcutaneous and intramuscular routes was successful, with a rapid control of parasitaemia to 5% after about 3 and 5 days respectively, with a relapse to 12% and 6%, and a reduction in P.C.V. of only about 25% compared with a loss of 55% in the controls.

In the comparison of the single and double treatments with "Imidocarb" administered to calves infected with *A. marginale*, the calves treated twice made the better recovery as shown by a delayed relapse and the milder mean maximum percentage parasitaemia on relapse, while 3 of the 4 controls died.

The calves treated with 1.5 mg./kg. 3,3'-bis-(4-methyl-2-imidazolin-2-yl) carbanilide dihydrochloride gave the results to be expected by comparison with a similar dosage of "Imidocarb," with a slightly longer time to reduce the parasitaemia to below 5% and a slightly greater loss in P.C.V. It can therefore be concluded that a dosage of 2 to 3 mg./kg. of this salt would be satisfactorily effective against anaplastomsis.

(b) Intact steers.—In the first experiment the 3 untreated controls died 7 days afer reaching 20% parasitaemia, with a miximum parasitaemia of 70% and a loss in P.V.C. of 65%. In the group treated with 2.5 mg./kg. "Imidocar," parasitaemia was controlled to below 5% in about 3 days and to zero in 6 days with a relapse to a maximum of 14% at 26 days after treatment (FIG. II). The variation in the P.C.V. of the treated adults followed the changes in the extent of the parasitaemia, with a relapse to a 26% loss of P.C.V. from treatment after 26 days.

2.5 mg./kg. was found to be the required dosage for subcutaneous administration of "Imidocarb" in the treatment of anaplasmosis, with a lower maximum parasitaeima post-treatment, a shorter time to reduction of parasitaemia to 5% and a less severe relapse than the 3.5 mg./kg. and 1.5 mg./kg. dosage levels.

In the comparison of a single with double and triple treatments with "Imidocarb," the single treatment seemed just as effective as the repeated treatments. All the treated animals responded with a reduction of parasitaemia to 5% in an average of 2½ days.

The relapses were later and slightly more severe in the animals receiving more than one treatment and therecovery was no better. In the untreated controls there was a wide variation in response to the infection and consequently their average peak percent parasitaemia was no greater than in the treated animals. However individual control animals showed severe symptoms with a high parasitaemia, a greater loss in both percent P.C.V. and weight of the animal.

The method outlined in Example (b)(4) provided a satisfactory "sterilization" in adult "carrier" cattle, as determined by the methods disclosed in the specification.

In the prophylatic investigation the healthy adult cattle who had received "Imidocarb" successfully resisted infection when challenged with the Sukari strain of *A. marginale*.

TABLE I.—CALVES, SUMMARY OF OBSERVATIONS (GROUP AVERAGES)

| Experiment number | Onderstepoort | | | | | | Sukari | | | | | |
|---|---|---|---|---|---|---|---|---|---|---|---|---|
| | 1 | | 3 | | | | 4 | | | 5 | | |
| Treatment dose (mg./kg.) and | 3 | Controls | 3 | 2 | 1 | Controls | 2 | 2 | Controls | 2.5 | 2.5+2.5 | Controls |
| Route | S/C | | S/C | S/C | S/C | | S/C | I/m | | S/C | S/C | |
| Number of animals | 3 | 2 | 5 | 5 | 6 | 3 | 6 | 6 | 3 | 8 | 8 | 4 |
| Mortality | 0 | 0 | 0 | 0 | 0 | 0 | 0 | 0 | 0 | 0 | 0 | 3 |
| Mean max. parasitaemia (percent) post-treatment | 17 | 34 | 20 | 20 | 25 | 37 | 18 | 19 | 32 | 19 | 21 | 39 |
| Mean days treatment to 5% parasitaemia | 2.0 | 7.0 | 3.8 | 4.6 | 6.0 | 8.6 | 2.8 | 5.1 | | 3.1 | 3.4 | |
| Mean max. parasitaemia on relapse | 2.5 | 9 | 6.0 | 4.9 | | 6.2 | 12 | 6.0 | 12 | 17 | 6.2 | 13 |
| Reduction PCV (percent) from time of treatment to (100% on day 0) | 24 | 47 | 25 | 27 | 44 | 49 | 27 | 23 | 55 | 31 | 31 | 54 |

TABLE II.—ADULTS, SUMMARY OF OBSERVATIONS (GROUP AVERAGES)

| Experiment number | 1 | | 2 | | | | 3 | | | | |
|---|---|---|---|---|---|---|---|---|---|---|---|
| Treatment dose (mg./kg.) | 2.5 | Controls | 3.5 | 2.5 | 1.5 | Controls | 2.5 | 2.5+1.25 | 2.5+1.25 | 2.5+1.25 | Controls |
| and Route | S/C | | S/C | S/C | S/C | | S/C | [7] | [14] | +1.25 | |
| Number of animals | 9 | 3 | 7 | 7 | 7 | 5 | 7 | 7 | 7 | 7 | 6 |
| Mortality | 0 | 3 | 0 | 0 | 0 | 0 | 0 | 0 | 0 | 0 | 0 |
| Mean max. parasitaemia (percent) post-treatment | 22 | 70 | 20 | 17 | 20 | 34 | 21 | 21 | 19 | 20 | 20 |
| Mean days treatment to 5% parasitaemia | 3.4 | | 3.0 | 2.1 | 2.7 | 7.8 | 3.0 | 2.6 | 2.3 | 2.3 | 5.2 |
| Mean max. parasitaemia on relapse | 14.1 | | 17 | 15 | 21 | 12 | 20 | 19 | 21 | 17 | 12 |
| Reduction PCV (percent) from time of treatment to min. (100% on day 0) | 26 | 64 | 20 | 24 | 14 | 39 | 11 | 14 | 11 | 14 | 22 |

What we claim is:

1. A method for the stimulation of immunity against anaplasmosis in infected cattle, comprising the parenteral administration of an effective anaplasmosis immunity stimulation amount of a compound of Formula I or a therapeutically acceptable acid addition salt thereof,

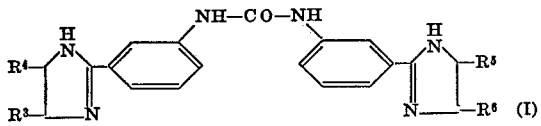

wherein $R^3$, $R^4$, $R^5$ and $R^6$ are the same or different and each is a hydrogen atom or an alkyl group having 1 to 4 carbon atoms, Formula I or a salt thereof, as defined above, to said cattle infected with Anaplasma.

2. A method as claimed in claim 1, wherein the compound of Formula I is 3,3'-bis-(4-methyl-2-imidazolin-2-yl) carbanilide.

3. A method as claimed in claim 1, wherein the salt of the compound of Formula I is the dihydrochloride.

4. A method as claimed in claim 1, wherein the salt of the compound of Formula I is a carboxylic acid salt.

5. A method as claimed in claim 4, wherein the carboxylic acid salt is a dipropionate.

6. A method as claimed in claim 4 wherein the carboxylic acid salt is selected from the class consisting of diacetate, dilactate and diformate.

7. A method as claimed in claim 1, which comprises the repeated administration of the specified dosage after at least 6 days and not more than 18 days have elapsed from the initial administration.

8. A method of virtually complete eradication of the Anaplasma organism in adult carrier cattle comprising the repeated administration to adult carrier cattle of an effective Anaplasma organism eradication amount of a compound of Formula I or a therapeutically acceptable acid addition salt thereof

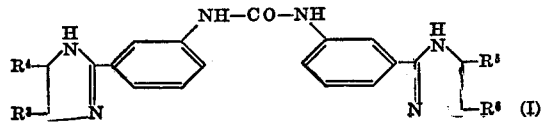

wherein $R^3$, $R^4$, $R^5$ and $R^6$ are the same or different and each is a hydrogen atom or an alkyl group having 1 to 4 carbon atoms, over a period of from a few days up to a few months.

9. A method as claimed in claim 8, wherein the compound of Formula I is 3,3'-bis-(4-methyl-2-imidazolin-2-yl) carbanilide.

10. A method for the stimulation of immunity against anaplasmosis in cattle which comprises the parenteral administration of an effective anaplasmosis immunity stimulation amount of the compound 3,3'-bis-(2-imidazolin-2-yl) carbanilide or a therapeutically acceptable acid addition salt thereof to cattle infected with Anaplasma.

11. A method according to claim 10 in which 3,3'-bis-(2-imidazolin-2-yl) carbanilide dihydrochloride is administered.

12. A method according to claim 11 in which about 2 to 3 mg./kg. of animal body weight of the compound of claim 11 is administered.

13. A method as claimed in claim 10, wherein the parenteral treatment is effected by the subcutaneous route.

14. A method as claimed in claim 10, wherein the parenteral treatment is effected by the intramuscular route.

15. A method of virtually complete eradication of the Anaplasma organism in adult carrier cattle, comprising the repeated administration to adult carrier cattle of an effective Anaplasma organism eradication amount of the compound 3,3'-bis-(2-imidazolin-2-yl) carbanilide or a therapeutically acceptable acid addition salt thereof over a period of from a few days up to a few months.

16. A method according to claim 15 in which 3,3'-bis-(2-imidazolin-2-yl) carbanilide dihydrochloride is administered.

17. A method as claimed in claim 15, wherein the administration is effected by the subcutaneous route.

References Cited

Beveridge—Chem. Abst., vol. 72 (1970), p. 77293S.
Miller—Encyclopedia of Animal Care (1962), p. 623.

SAM ROSEN, Primary Examiner.

UNITED STATES PATENT OFFICE
CERTIFICATE OF CORRECTION

PATENT NO. : 3,795,737
DATED : MARCH 5, 1974
INVENTOR(S) : NICHOLAS McHARDY ET AL.,

It is certified that error appears in the above-identified patent and that said Letters Patent are hereby corrected as shown below:

Claim 1, lines 9 and 10, please delete "Formula I or a salt thereof, as defined above,"

Signed and sealed this 22nd day of April 1975.

(SEAL)
Attest:

RUTH C. MASON
Attesting Officer

C. MARSHALL DANN
Commissioner of Patents
and Trademarks